United States Patent [19]

Graziano

[11] 4,450,695
[45] May 29, 1984

[54] ANTI-THEFT DEVICE FOR AUTOMOBILE TOPS

[76] Inventor: Nick Graziano, 1800 N. Sayre, Chicago, Ill. 60635

[21] Appl. No.: 323,231

[22] Filed: Nov. 20, 1981

[51] Int. Cl.³ .............................................. B65D 55/14
[52] U.S. Cl. ........................................ 70/168; 70/211
[58] Field of Search ..................... 70/58, 63, 158, 163, 70/164, 166, 167, 168, 170, 171, 172, 201, 202, 203, 207, 209, 210, 211, 212, 229, 232; 296/98, 216, 218, 224

[56] References Cited

U.S. PATENT DOCUMENTS

| | | | |
|---|---|---|---|
| 3,699,787 | 10/1972 | Carrado | 70/58 |
| 4,099,593 | 7/1978 | Schultz | 70/163 |
| 4,302,045 | 11/1981 | McAdams | 296/224 |
| 4,325,531 | 4/1982 | Omholt | 70/63 |
| 4,334,578 | 6/1982 | Labrum | 70/164 |

*Primary Examiner*—Robert L. Wolfe
*Attorney, Agent, or Firm*—Laff, Whitesel, Conte & Saret

[57] ABSTRACT

An anti-theft device for preventing the unauthorized removal of T-tops from an automobile including an enclosure for enclosing and preventing access to the T-top handle. A key actuated latch plate secures a separable cover to base plate forming the enclosure and is operative to hold the cover nested on the base plate until locked.

5 Claims, 4 Drawing Figures

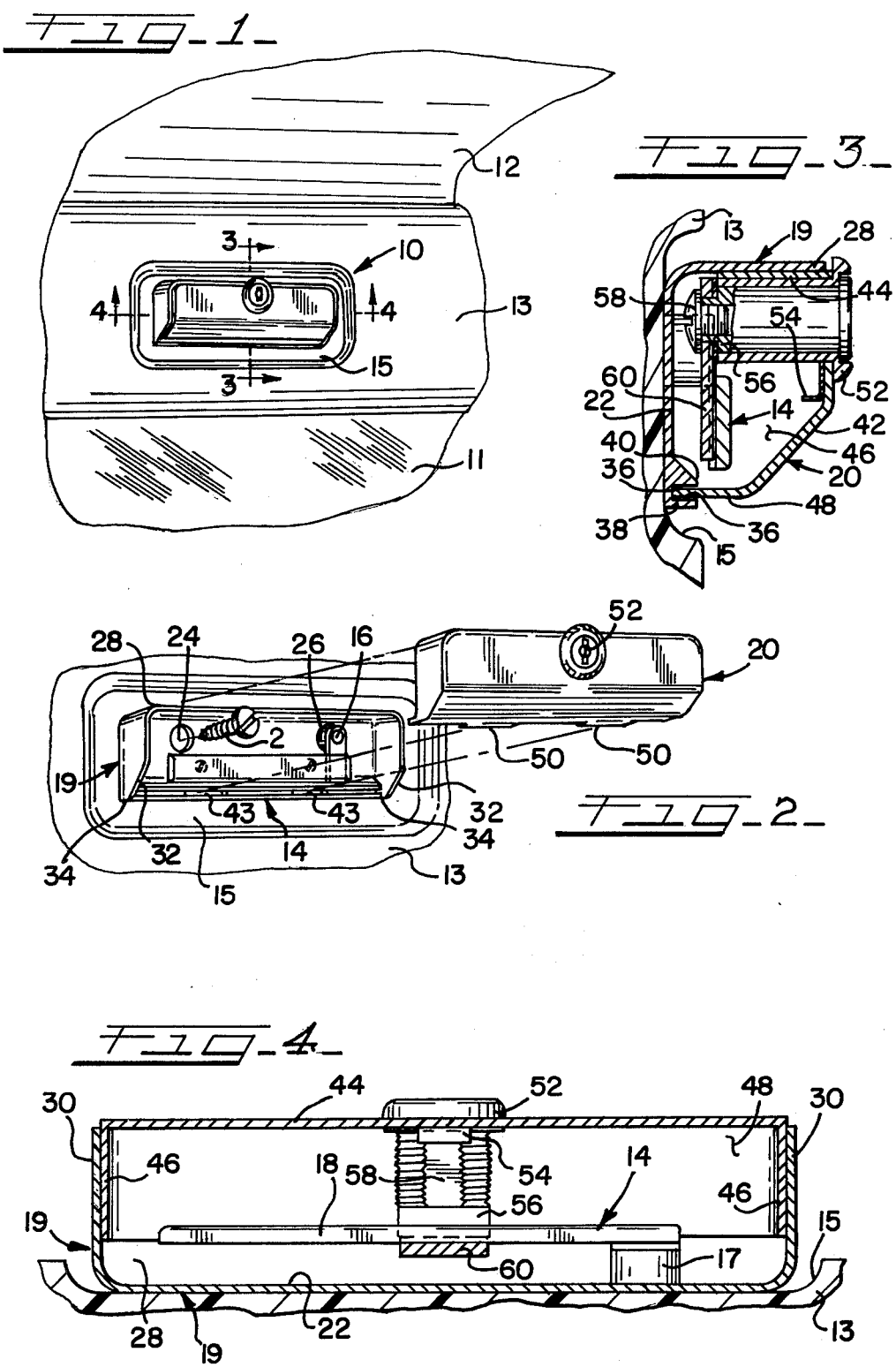

ANTI-THEFT DEVICE FOR AUTOMOBILE TOPS

BACKGROUND AND SUMMARY OF THE INVENTION

The present invention relates to security or anti-theft devices and more particularly, to a security device for preventing the theft or unauthorized removal of a T-roof from an automobile.

Automobiles roofs may be constructed with a removable section known as a T-roof. Such T-roofs may be removed in temperate weather so that the occupants may take advantage of the fresh air and sunshine while driving. However, on other occasions, the T-roof may remain in place and attached to the main roof sections.

Attachment of the T-roof to the main roof section is generally accomplished by latch arrangements located on the main roof section and T-roof. Such latch arrangements include an actuating handle located on the interior side of the T-roof so as to be accessible to the occupant. The actuating handle is also generally used to manipulate the T-roof during installation and removal from the main roof section.

Notwithstanding that the handle is located on the interior of the automobile, the T-roof is frequently removed by unauthorized people and either stolen or vandalized by gaining simple entry into the interior compartment of the automobile.

SUMMARY OF THE PRESENT INVENTION

By the present invention, it is porposed to provide an arrangement for preventing the removal of the T-roof by unauthorized personnel.

This is accomplished by providing the removable roof section of the automobile with an anti-theft device comprising an attachment plate which is secured to the T-roof section about the handle. The attachment plate includes a peripheral projecting flange which accommodates the handle within the confines thereof. A housing seats within the flange to enclose the handle. A key operated rotary lock is mounted on the cover and has a latch plate secured on the inner end thereof. The latch plate is turnable upon actuation of the lock from a locked position between the handle and the inner wall of the T-roof and an unlocked position clear of the handle so as to permit removal of the cover and permit access to the handle.

BRIEF DESCRIPTION OF THE DRAWINGS

FIG. 1 is a fragmentary view of an automobile roof having a T-top section and showing the anti-theft device of the present invention mounted thereon.

FIG. 2 is an exploded view of the anti-theft device showing the cover removed.

FIG. 3 is a cross sectional view taken generally along the lines 3—3 of FIG. 1.

FIG. 4 is a cross sectional view taken generally along the lines 4—4 of FIG. 1.

DESCRIPTION OF THE PREFERRED EMBODIMENT

Referring now to the drawings the anti-theft device of the present invention is shown embodied in an automobile roof 11 having a removable T-top section 12. A reinforcing rim 13 may extend about the periphery of the T-top. The rim 13 may be provided with a handle assembly along the opposite sides thereof. Only one such handle assembly 14 is shown, it being understood that the other handle and the anti-theft device associated therewith is of identical structure. The handle assembly 14 may be conveniently disposed in a recess section 15 of the rim 14.

The handle assembly 14 includes a shaft 16 turnably mounted on the T-top section. A latching arrangement may be provided on one end of the shaft (not shown) for latching the T-top section to the automobile roof. A bushing 17 is disposed on the other end of the shaft 16 and fixed thereto is a hand lever 18. It is to be noted the hand lever 18 is spaced from the roof wall 12.

Disposed within the recess 15 and about the handle assembly 14 is the anti-theft device 10. The anti-theft device includes generally a base (or mounting) plate 19 and a cover 20.

The base plate 19 may be made from a casting or fabricated from sheet metal or the like. The base plate 19 includes a rear panel 22. A pair of openings 24 and 26 are provided in the rear panel 20 of which the opening 26 accommodates the handle (not shown). The opening 24 receives a fastner device such as a screw 2 for securing the base plate 19 to the T-top.

Extending from the base panel 22 is an upper flange and a continuous side flanges 30—30. The lower edges of each of the side flanges 30—30 may be inclined inwardly to merge with a bottom edge 34.

A groove 36 extending between the side walls 30—30 is defined by a flange or lip 38 found along the lower edge of the base panel 22 and a vertically spaced flange 40. The groove 36 may be provided with lengthwise spaced locating seats 43.

The cover 20 includes a cover panel 42 and inwardly projecting top flange 44, continuous side flanges 46 and a bottom flange 48. The side flanges are shaped complementary to the side flanges 30—30 so as to form an enclosure therewith. Extending from the bottom flange are locating tabs 50—50 spaced complementary to the locating seats 43.

Mounted on the cover panel 42 is a conventional tumbler lock 52 which is fixed thereto by clip 54. Fixed to the inner end of the tumbler shaft 56 as by a screw 58 is a lock plate 60. The lock plate 60 is mounted for turning movement with the tumbler shaft 58 upon turning of a key (not shown). The lock plate 60 moves from horizontal release position clear of the T-top handle 14 to a vertical position between the handle 18 and the base panel 22 to hold the T-top locked to the car roof.

Assuming that the T-top 12 is removed from the car roof 11 and it is desired to replace it on the latter, the T-top is lifted and placed in position so that the handles 14 may be turned to a horizontal position to hold the T-top latched to the roof. The cover 20 is then placed on the base or mounting plate with the locating tabs 50—50 seated within the locating recesses 43 on the base plate. At the same time the inner edge of the bottom flange 48 is seated within the groove 40. The side flanges 46—46 and the top flange 44 are also rested within the side walls 30—30 and top flange 28 of the base plate. The T-top handle 14 is thus completely enclosed and is inaccessible until the cover panel is removed.

The tumbler lock 58 is then turned so that the latch plate 60 is located between the handle 14 and the base plate so that the cover 20 is securely locked. Thus, the T-top handle 14 is inaccessible until the cover 20 is removed by the possessor of a key for turning the lock to a release or horizontal position so that the cover may be separated from the base.

What is claimed is:

1. An anti-theft device for preventing the unauthorized removal of a T-top roof section having a handle actuated latching means for fastening the T-top to an automobile, said device comprising a base plate having a base panel outwardly projecting top and side flanges, said base plate being fastened to said T-top and encompassing said handle, a groove along the lower edge of said base plate extending between said side flanges, a cover including a cover panel and a top flange and side flanges complementary to said base top and side flanges to form an enclosure therewith and including a bottom flange having an edge portion seatable within said groove, a key operated lock means mounted on said cover and including a locking plate movable between a release position above said T-top handle and a latch position disposed between said T-top handle and base panel whereby said handle is enclosed by said cover and inaccessible until said key operated lock means is actuated to a release position.

2. The invention as defined in claim 1 wherein said key operated lock is a tumbler lock and said latch plate is turnable therewith between a horizontal release position and a vertical latched position.

3. The invention as defined in claim 2 wherein said cover top and side flanges are rested within said base top and side flanges.

4. The invention as defined in claim 3 wherein said groove is provided with a pair of spaced recesses and said bottom flange of said cover includes a pair of locating tabs seatable within said recesses.

5. An anti-theft device for preventing the unauthorized removal of a T-top roof section having a pivotal handle actuated latching means for fastening the T-top to an automobile, said device comprising a base plate having a base panel and outwardly projecting top and side flanges, said base plate being fastened to said T-top and encompassing said handle, a cover including a cover panel and a top flange and side flanges complementary to said top and side flanges of said base plate to form an enclosure therewith, a key operated lock means mounted on said cover and moveable between a release position and a locked position, said lock means when in said locked position securing said cover adjacent said base plate whereby said handle is enclosed by said cover and is inaccessible until said key operated lock means is actuated to a release position to release said cover from adjacent said base plate.

* * * * *